Nov. 12, 1963

S. THOMSEN 3,110,652

CARBONIZING UNIT

Filed July 11, 1960

INVENTOR
SVEND THOMSEN

BY
Watson, Cole, Grindle & Watson
ATTORNEY

Nov. 12, 1963

S. THOMSEN 3,110,652

CARBONIZING UNIT

Filed July 11, 1960

INVENTOR
SVEND THOMSEN

BY *Watson, Cole, Grindle & Watson*

ATTORNEY

Nov. 12, 1963 S. THOMSEN 3,110,652
CARBONIZING UNIT
Filed July 11, 1960 3 Sheets-Sheet 3

INVENTOR
SVEND THOMSEN

BY Watson, Cole, Grindle & Watson
ATTORNEY

United States Patent Office 3,110,652
Patented Nov. 12, 1963

3,110,652
CARBONIZING UNIT
Svend Thomsen, Conway, S.C., assignor, by mesne assignments, to Charcoal Industries, Inc., Greenville, S.C.
Filed July 11, 1960, Ser. No. 41,833
18 Claims. (Cl. 202—114)

This invention relates to improvements in carbonizing units primarily intended for treating organic materials, such as sawdust and other mill waste in generally granular or comminuted form, to produce charcoal. This application is a continuation in part of application Serial No. 839,092, filed November 17, 1959, now abandoned and Serial No. 25,633, filed April 29, 1960.

In the class of carbonizing unit constituting the subject matter of this invention, one or more tubular retorts extend horizontally through, and are heated in, a furnace of the gas-fired type, and the organic material is fed continuously through them by suitable conveyor means. The vapors given off by the heated material by its passage through the tube or tubes is collected in an accumulator, and a portion at least of such vapors is withdrawn and delivered into the burner of the furnace to be consumed therein and to produce the heat for carrying out the process.

In devices of this class, however, it has been found that the evolved gases have been greatly in excess of the amount required for firing the furnace. Also, it has been usual to deliver the vapors or gases to the furnace indiscriminately so that the said gases include both the comparatively volatile vapors containing a high percentage of tars, which may condense on the walls of the passageway leading to the burner, as well as a high percentage of undesired water vapor, which is driven off from the material during the early stages of its heating and immediately following its entering into the heated portion of the retort tubes. Moreover, the passage of this water vapor completely through the tubes to emerge from a point normally adjacent the discharge ends thereof imparts some of the moisture to the treated material and may tend to retard the treatment thereof.

While it has been customary to provide means for drawing off or permitting the escape of excess gases in such a unit, this has been done in some cases by permitting them to be drawn into the furnace smokestack, thereby creating a suction which affects the flow of gases in the burner and hence the entire unit. Moreover, the delivery of these vapors into the highly heated smokestack has frequently been found to result in their catching fire within the smokestack and sometimes causing appreciable damage.

With the foregoing considerations in mind, a primary object of the present invention is to provide, in a unit of the foregoing type, a means independent of the furnace stack, for permitting the escape of vapors in excess of the amount required for operation of the burner, and in a manner not to produce any substantial effect upon the flow of gases to the burner.

Also, it is an object first to draw off the vapors emitted immediately following entry of the organic material into the retort tubes and its subjection to the heat therein. These vapors include both the relatively highly volatile vapors with their high content of tarry or gummy residue, plus the usual relatively high percentage of water vapor given off incident to the initial drying of the material. These may be generally classed as the undesired gases or vapors. Thus, in accordance with the invention, normally only the vapors evolved from the material during the latter portion of its passage through the tubes are delivered to the burner.

Of these latter desired gases or vapors, as above mentioned, it happens frequently that there is an excess over the requirements of the burner. It is, accordingly, a further important object of the invention to use these latter vapors to good advantage in increasing the drying and efficiency of operation within the retort tubes by permitting the back- or counterflow of these evolved gases, solely under the pressure of their evolution, in a direction toward the infeed ends of the respective tubes, whereby these vapors which are normally superheated and quite dry may act to exert an increased drying action, as well as to convey heat to the infeed end portions of the tubes and the infeeding material therein.

In order to achieve these primary objects, the invention includes gas or vapor accumulators, one of which communicates with the discharge ends of the tube or tubes and from which the accumulated vapor is delivered to the burner, simply in response to the burner demands. The other accumulator communicates with the respective tubes adjacent their infeed ends, and the tubes are so arranged and so supplied with material to be treated as to leave in each a free space throughout the length thereof, through which vapors may travel toward either accumulator. Thus, normally the initially created vapors adjacent the infeed ends of the tubes will flow into the accumulator at that end and may escape from the accumulator through a novel means, into a suitable vapor stack separate from the furnace stack and in a manner such as not to create a draft or suction through the tubes and to the burner supply. With this arrangement, all gases not required to meet the demands of the burner will find their way into the accumulator at the infeed end for subsequent discharge and, in particular, the excess gases evolved during the later stages of the progress of the material through the tubes may flow backwardly through the tubes and toward the infeed end to exert an improved heating and drying action on the material initially entering the tubes.

It is a further specific object to provide an improved and novel form of apparatus associated with the accumulator at the infeed end for removing the excess gases therefrom, without creating a suction such as might affect the rate of flow of gases to the burner.

Still further specific objects are to provide a dual utilization of the discharge accumulator, both as a gas accumulator and as a receiving bin with self-contained discharge conveyor for reception and handling of the carbon products received from the discharge ends of the respective retort tubes; to provide for a dual functioning of the infeed hopper both as a receptacle to receive the material to be carbonized and as a device to meter the material being fed into the carbonizing tubes; to provide a gas accumulator at the infeed ends of the tubes; and also to provide an enclosed conveyor in substantially vapor-tight communication with the said hopper for delivering the material thereinto from a location below the hopper whereby to avoid creation of any updraft through the hopper, such as might cause ignition of the infeeding material within the hopper.

It is a still further specific object to provide for a novel association of the tubes and infeed hopper and/or accumulator structure with the furnace, to permit thermal expansion and contraction of the tubes without imparting the forces of such expansion to the furnace walls or to other normally stationary parts.

The foregoing, as well as still further identical objects and advantages, are all achieved by the preferred embodiment of the invention illustrated in the accompanying drawings, in which:

FIGURE 7 is a vertical cross section on the line 7—7 of FIGURE 1.

Figure 1:
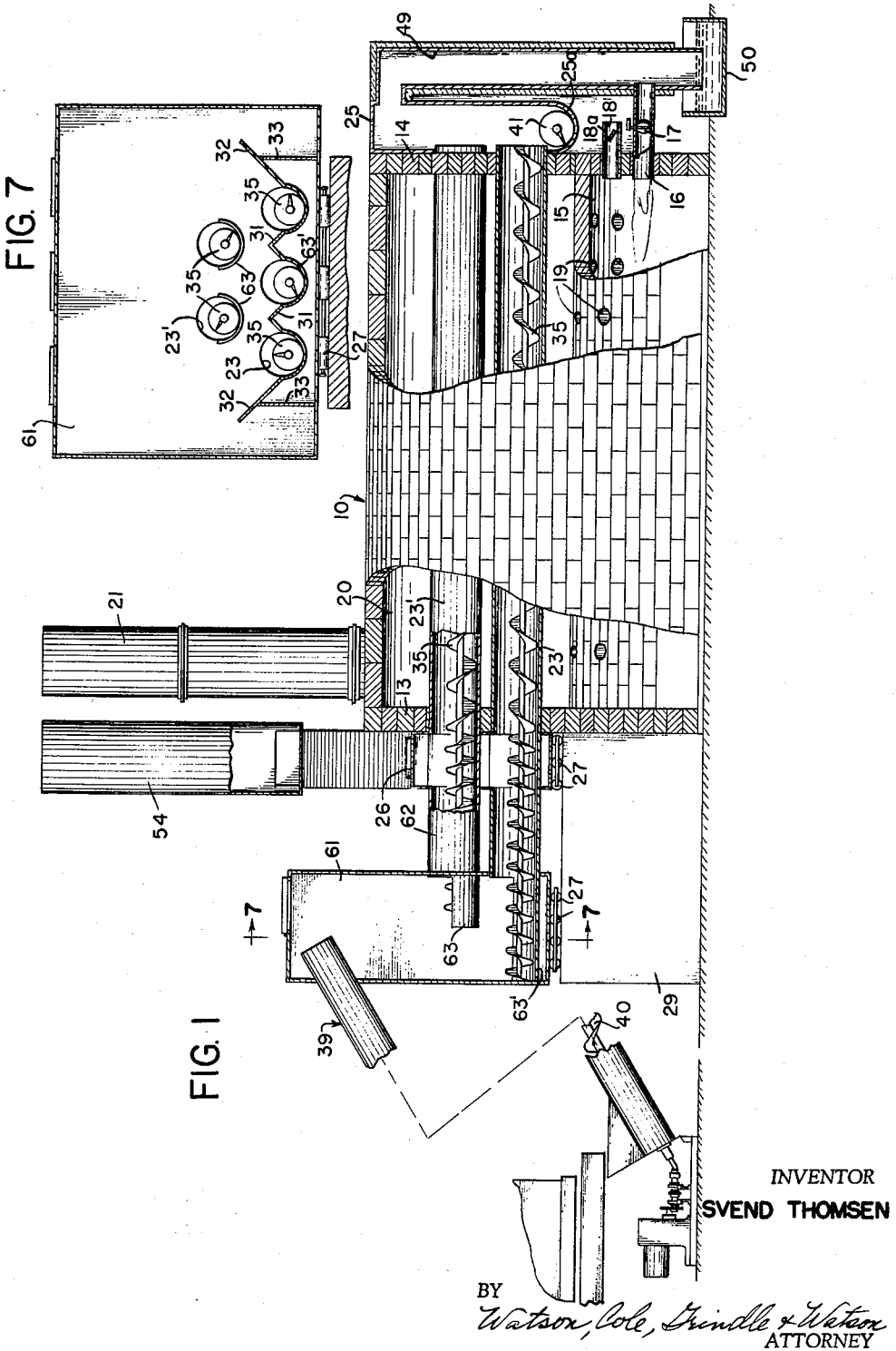
FIGURE 1 is a side elevation with parts broken away, showing a complete carbonizing unit in accordance with the invention.

Referring now in detail to the accompanying drawings, the carbonizing unit incorporating the features of the invention includes the heating unit or furnace designated 10 in its entirety, which for purposes of simplification is shown as constructed of masonry, though this is by no means essential. Such a furnace is shown as including the parallel side walls 11 interconnected by an arcuate top section 12, together with infeed and discharge end walls 13 and 14, respectively. Within the structure defined by these walls, an inner combustion chamber 15 preferably is defined by fire brick in the form of an arcuate structure. One or more burners, as exemplified by the nozzle 17 project into the combustion chamber 15 through an opening 16 in the discharge end wall 14. Combustion air is admitted, as for instance through inlet tube 18 and regulated by a damper 18a in said tube, for combination with the vapor or gases supplied through the nozzle 17. The fire brick walls defining the chamber 15 will be seen to be formed with a series of substantially uniformly distributed openings 19, through which the heat of combustion and the heated combustion products may escape into a heating chamber 20, constituting that portion of the furnace interior located outside of and above the combustion chamber 15. The products of combustion escape in the usual manner through a main vertical draft stack 21. Within the stack 21, there is operatively disposed a suitable valve or damper 22, which normally is open during the operation of the unit, but which may be closed primarily for the purpose of minimizing the heat loss from the furnace and the various retorts therein during periods when it is desired to temporarily discontinue the operation of the unit as, for instance, to remove foreign objects from the material within the infeed ends of the retort tubes hereinafter described in more detail.

At least one, and preferably a plurality of, open-ended cylindrical retort tubes extend through the heating chamber, there being an upper series of said tubes 23′ and a lower series 23. It will be understood that the said tubes are identical in their construction. All of the said tubes extend through and lengthwise of the heating chamber 20, with their ends projecting through and supported by the respective infeed and discharge end walls 13 and 14 of the furnace structure. The tubes 23 of the lower series, respectively, are relatively laterally staggered or offset with respect to the tubes 23′ of the upper series, whereby all of the tubes may be more efficiently exposed to the heat source beneath them, and in addition, by virtue of such relative staggering, their infeed end portions may be more readily supplied with infeeding material for treatment.

Figure 6:
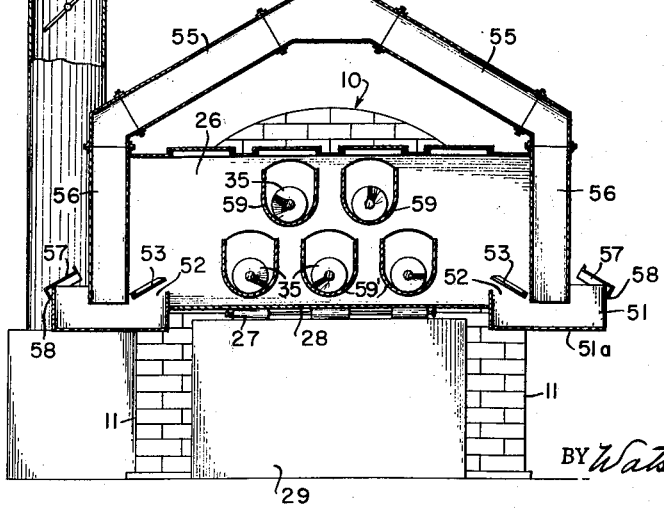
FIGURE 6 is a vertical cross section on the line 6—6 of the FIGURE 2.

At their discharge ends, the respective tubes 23 and 23′ are preferably bolted to the discharge end wall 14 and are arranged to discharge their evolved vapors into a vapor-tight enclosure or accumulator 25, which may be hereinafter termed the discharge accumulator. The accumulator 25 also may conveniently be utilized as a receiving bin for the carbonized material discharged from the said tubes. The infeed ends of the respective tubes 23 and 23′, on the other hand, slidably project through and substantially beyond the infeed end wall 13, to permit thermal expansion and contraction of the tubes without imposition of a bursting strain upon the furnace walls. Said infeed ends also are received and enclosed in a substantially gas-tight enclosure or accumulator 26, which may be referred to hereinafter as the infeed accumulator. This infeed accumulator is carried by the infeed end portions of the respective tubes for movement therewith incident to their thermal expansion and contraction. Preferably, infeed accumulator 26 and its associated tube ends are supported for such movement by means more or less diagrammatically exemplified by the rollers 27 interposed between relatively parallel horizontal surfaces of the accumulator bottom 28 and the supporting base or block 29, all as shown in FIGURES 1 and 6.

Within the infeed accumulator 26, the upper portion of the tube ends are cut away to define upwardly opening troughs 50, 59′ to permit the flow of excess gases generated within the respective tubes into said infeed accumulator. The infeed unit is composed of an infeed hopper 61 and a metering device 62 consisting of open ended tubes arranged to communicate with the carbonizing tubes 23 and 23′. Said metering device 62 is located between the infeed accumulator 26 and the infeed hopper 61. Within the infeed hopper 61 there are disposed so as to communicate with the tube in the metering device a series of troughs 63 and 63′. Material to be carbonized is delivered to said troughs 63 and 63′ from a location above both series thereof, whereby it will be seen that their staggered relation renders all of the troughs readily accessible to receive such material. To facilitate delivery of material to the respective troughs, the troughs 63 of the upper series are relatively laterally spaced, so that the material or, at least a portion thereof, may pass down between them to the troughs of the lower series, However, the adjacent upper edges of relatively adjoining lower troughs 63′ are interconnected by bridging pieces 31 of substantially inverted V cross section to prevent material from entering and lodging between adjoining such troughs 63′. At the same time, the relatively remote upper edges of the outermost troughs 63′ are provided with inclined relatively upwardly-diverging extensions 32, which may be reinforced by vertical support members 33, extending upwardly from the bottom of the infeed hopper 61. These extensions 32 merely function to guide the material into the outermost troughs.

Suitable means for conveying the material to be carbonized through the respective tubes 23, 23′ is exemplified by the auger conveyors 35, respectively disposed in the said tubes for rotation and coextensive in length with the tubes and their respective feed troughs 63, 63′, 59 and 59′. The shafts of these augers or screws 35 are rotatably disposed through the front end wall of the infeed hopper 61 and are operatively received in driven relation in a gear box 36 supported externally on the infeed hopper 61. The drive from a motor 37 is imparted through speed reducer unit 38 and the gear box 36 to the respective augers 35. It will be seen that the entire drive mechanism comprising the elements 36, 37 and 38 is carried at the ends of the shafts of augers 35 externally of the infeed hopper 61 for movement with the ends of the augers 35, their associated tubes 23, 23′, the infeed accumulator 26, the metering device 62 and the infeed hopper 61 incident to thermal expansion and contraction of the elements 23, 23′ and 35.

The discharge ends of the respective augers 35 are not necessarily restricted to any predetermined position as by bearings at said end, whereby the free ends of the augers may float and on occasion be raised from the bottoms of their respective tubes, to thus improve their action in conveying therethrough various large masses or clumps of the material and possibly foreign objects, without becoming clogged. Moreover, the omission of such supporting bearings at these free ends of the augers further contributes toward a free passage for the material in its discharge from the augers. The clearance between the respective augers and the top portions of their respective tubes or, in other words, the substantial difference in diameter between each auger and its tube permits the aforesaid floating action of the augers, as well as providing the through passageways for vapors as heretofore described.

While it is important for the purposes of the invention to provide the free passageways for vapors in the upper portions of the respective retort tubes, it is of very considerable importance, particularly in view of these free passageways, to avoid any opening in the metering device 62 or the infeed hopper 61, such as might result in the formation of any appreciable drafts through the burner tubes 23, 23' in a direction toward their infeed ends and which would result in the igniting of the incoming material within the accumulator 26, the metering device 62 or the infeed hopper 61. This is a very real danger and actually occurs from time to time in the prior known units of the general type here involved, particularly under circumstances where the augers corresponding to 35 become jammed or otherwise inoperative, thus disrupting the movement of the material through the tubes toward the discharge ends thereof.

With this in mind, in the instant invention, there is provided a closed conveyor exemplified by the tube 39 and the auger 40 rotatable therein, with the delivery end of the tube 39 in substantially vapor-tight communication with the enclosure or infeed hopper 61 at a central location above the various troughs 63 and 63' for delivery of material thereinto. The tube 39 is diagonally inclined with its delivery end uppermost, and its intake end disposed below the infeed hopper 61. Because of this disposition of parts, there is no way that an undesired draft such as above mentioned can be created.

Preferably, the operation of the auger 40 is continuous and at a uniform speed. In general, the delivery capacity of the conveyor 40 is such with respect to the combined conveying capacity of the augers 35, as to maintain the respective tubes 23 and 23' only partially filled, so as to leave the space above the augers 35 within their respective tubes unoccupied by the material being carbonized and free for the flow of vapors in the manner aforementioned.

Normally, however, the material being fed through the tube 39 will obstruct same sufficiently to prevent the passage of any appreciable amount of gases through the tube 39. Since the upper end of the tube 39 will normally be fixed to the infeed enclosure, the tube 39 and its lower end feed device will be mounted to permit its movement with the expansion and contraction incident to the slight movements of the infeed hopper, as caused by thermal expansion and contraction of parts.

It will be understood that the conveyor 40 and its associated tube 39 deliver material from any suitable source of supply and the conveyor 40 may be driven by any suitable and conventional means. However, these latter features constitute no essential part of the present invention, and accordingly are not illustrated herein.

Any conventional means (not shown) may be provided for discontinuing the operation of auger 40 in the event, through maladjustment or malfunctioning of augers 35 or 40, the level of infeeding material in the infeed and/or the retort tubes 23, 23' approaches such a height as would materially interfere with the flow of vapors through these parts in the manner herein described.

Sawdust, shavings or other comminuted organic material received in the feed troughs 63 and 63'; of the respective retort tubes is conveyed through the tubes at predetermined and relatively uniform speeds by the augers 35. The augers 35 are constructed with a one-half pitch flight on their infeed end. The use of one-half pitch flight of the thread on the portion of augers 35 extending outside the infeed end wall 13 of the furnace and located in the areas embraced within the infeed accumulator 26, the metering device 62 and the infeed hopper 61 provides a means of insuring a uniform and proper flow of material into the carbonizing tubes 23 and 23'. During its passage through these tubes, the material is subjected to the heat within the oven-heated chamber 20. The vapors evolved from the material during such heating may escape from either end of each tube and, in fact, will normally escape simultaneously through both ends by movement along the passageway or space within each tube above the auger 35.

Figure 2:
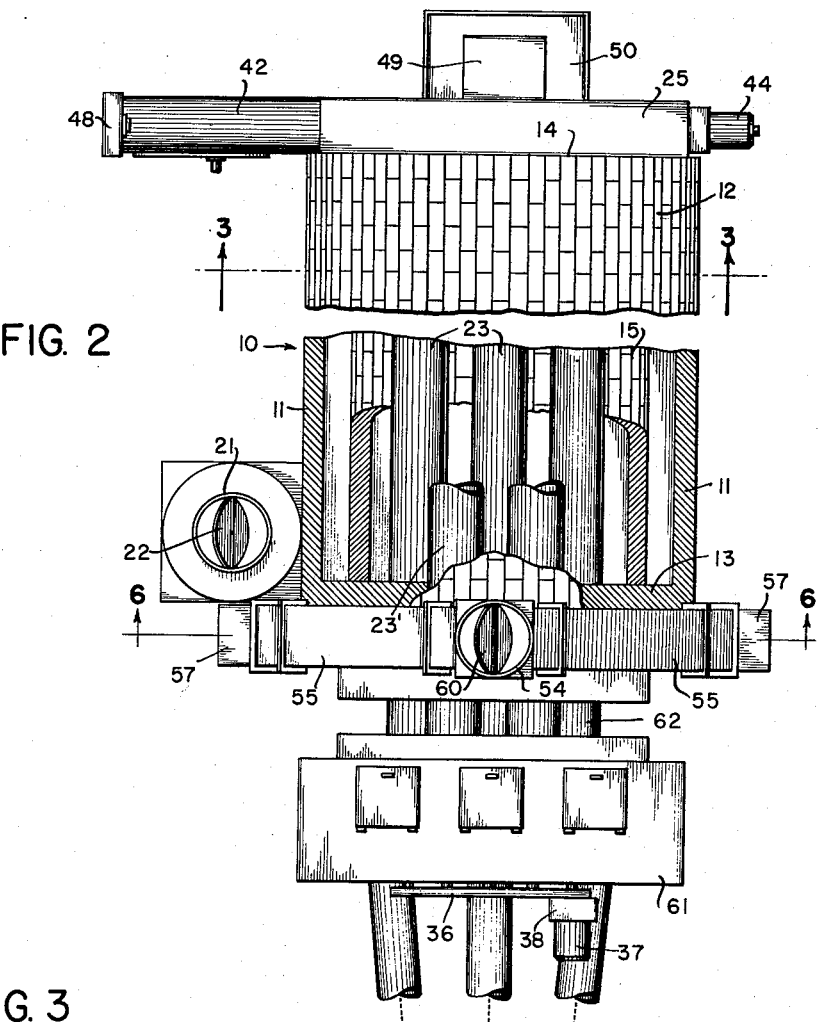
FIGURE 2 is a plan view, also with parts broken away, of the structure shown in FIGURE 1.
Figure 3:
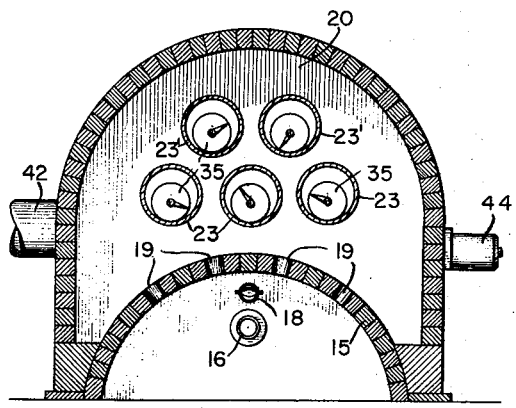
FIGURE 3 is a vertical cross section on the line 3—3 of FIGURE 2.
Figure 4:
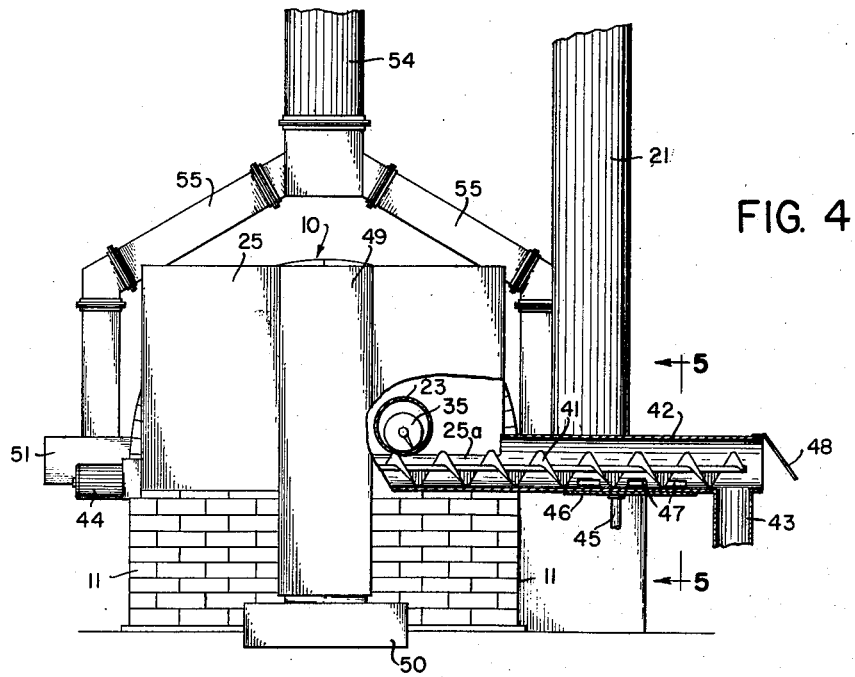
FIGURE 4 is an end elevation of the discharge end portion of the carbonizer unit, with a portion of the accumulator and its associated discharge conveyor broken away to illustrate the interior construction thereof.

Upon completion of its carbonization, the material in solid form is dicharged from the retort tubes 23 and 23' to an enclosed bin 25a, preferably having a conveyor 41 therein, the bin 25a being in gas-tight communication with the discharge tubes. Such a bin and its associated conveyor are advantageously combined with the discharge accumulator 25 in the manner illustrated in FIGURES 1 and 4, wherein it may be seen that the bin 25a assumes the form of a conveyor trough defining the bottom of the accumulator 25, and the conveyor 41 is in the form of a feed screw or auger rotatably disposed in this trough, both the trough 25a and auger 41 extending horizontally and transversely to the axes of the tubes 23, 23'. The auger 41 extends outwardly through one side wall of the accumulator 25 and is rotatably disposed in a conveyor conduit 42, in vapor-tight communication at one end with the accumulator 25 and constituting an extension of the bin or trough 25a. It will thus be apparent that the charcoal received in the bin 25a is removed by the action of auger 41 through the tube or conduit 42, and discharged through a downwardly directed discharge spout 43 opening into the bottom of the conveyor tube 42. The auger conveyor 41 may be rotated through operative connection to a motor 44, as shown in FIGURES 2 and 4.

Figure 5:
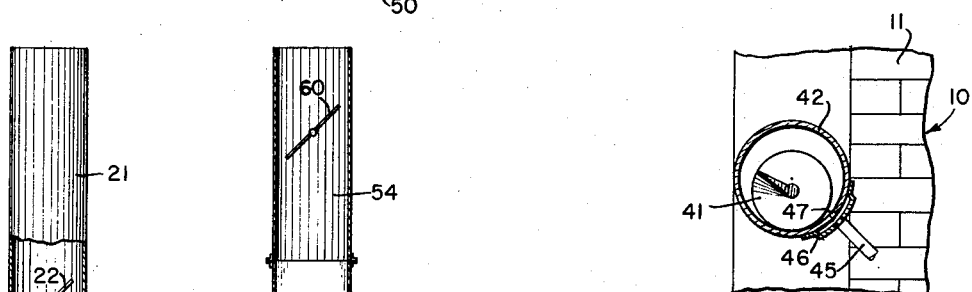
FIGURE 5 is a detailed section on the line 5—5 of FIGURE 4.

For the purpose of cooling and at least partially activating the charcoal during its passage through the discharge conduit 42 to the spout 43, steam is delivered through a pipe 45 (FIGURES 4 and 5) into a manifold housing 46 on the wall of conduit 42 and then is injected from said manifold into the conduit 42, through a series of injection ports 47, spaced at intervals axially along the conduit.

The free end of discharge conduit 42 preferably is provided with a hinged gate 48 (FIGURE 4) normally closed by gravity or by suitable resilient means, capable of opening responsive to the thrust of accumulated charcoal, which might, under some circumstances, bridge across the upper inlet end of the discharge spout 43. The gate 48 thus serves as a safety valve to prevent jam-ups, which might occur, with risk of breakage of the conveyor 41 and its associated conveyor structure.

As mentioned above, the vapors generated by the heating of the organic material within the tubes 23, 23' may escape from either end thereof. Normally, the more volatile gases, together with substantial quantities of water vapor, will evolve from the material immediately following its reception in the infeed end portions of their respective tubes and thus will naturally tend to escape through the infeed ends of the tubes into the infeed accumulator 26. Such accumulated vapor is of the type which is least desirable for use in the burner 16 due, both to its high water vapor content and also to its high content of tars and gummy substances which might condense upon and eventually clog the interior of the burner and the passageways therein. The gases or vapors evolved during the latter stages of the passage of material through the tubes is preferred for use in the burner or burner nozzle 16, inasmuch as it is relatively free of such objectionable constituents. Accordingly, these vapors, which normally tend to emerge through the discharge ends of the respective tubes 23 and 23' for collection in the accumulator 25, are delivered as required to the burner through an externally insulated conduit 49, which establishes communication between the discharge accumulator 25 and the gas burner nozzle 16. Normally, the last-mentioned vapors or gases adapted for use in the burner nozzle 16 are evolved in considerable excess of amounts required to operate the furnace. The said vapors or gases in the amounts required by the burner or nozzle 16 are drawn or urged through said nozzle into the burner chamber 15 for ignition, due in part to their own pressures and in part to suction created by the burner stack 21. The temperature of the oven and the rate of consumption of the gases or vapors by the burner normally is regulated through control of the damper or valve 17, which merely exemplifies one satisfactory means for achieving this end.

In the event of explosion of the heated gases within the discharge accumulator 25, as occasionally occurs, there is provided a novel form of safety valve capable of releasing the explosion pressure without damage, and of thereafter immediately closing to confine the vapors or gases against continued heat escape. Such a valve structure is shown in FIGURE 1, in which the conduit 49 extends below its juncture with the burner nozzle 16 and is received beneath the surface of the water in a water container or pan 50. There is thus provided a water seal which can yield under excessive pressures and which can immediately reestablish itself upon restoration of normal pressure.

From the foregoing description, it will be seen to be of extreme importance to be able to dispose of the undesired gases emitted adjacent the infeed ends of the respective tubes, as well as the excess of the more desirable gases not required for operating the burner. However, this must be done in such a manner as not to create a back draft or suction through the respective tubes or otherwise to substantially modify the gas pressure within the discharge accumulator, as obviously this would adversely affect the rate of supply of gas to the burner and render the unit quite eccentric and unreliable in operation. It is further desirable to cause the gases evolved at the midsections and toward the discharge ends of the tubes, and which are not needed by the burner, to flow through the respective tubes in a direction toward the infeed ends of the tubes or, in other words, in a counterflow direction with respect to the movement of the solid materials through these tubes. In so doing, these highly heated and water-free gases will serve the desirable function of assisting the drying of the incoming solid material adjacent the infeed tube ends, by removing water vapors therefrom. These water vapors, in turn, will serve to reduce the temperature of the gases received in the infeed accumulator 26 and thereby to reduce the danger of their ignition, either within the infeed accumulator or upon discharge therefrom.

For achieving the immediately preceding ends, the invention includes a novel means or mechanism for removing the vapors from the infeed accumulator 26, simply by permitting such vapors to escape substantially entirely in response to their increasing volume, caused by their continued evolution from the materials being treated, and without causing any substantial modification of the pressures within the accumulators 25 or 26 or the tubes interconnecting them. Thus, referring to FIGURES 1, 2 and 6, more especially the latter, it will be seen that there is mounted on each outer side wall of the accumulator 26 an upwardly opening receptacle or enclosure 51, having a closed bottom 51a. Each such enclosure 51 communicates with the interior of the infeed accumulator 26 at a level generally medially between the top and the bottom of the box or enclosure 51, through an outlet port 52, controlled by a valve or damper 53. The evolved vapors within the accumulator 26 thus are free to escape through the port 52 under normal circumstances into the boxes 51. In view of the usually noxious nature of these gases, it is desirable to disperse them into the upper air at an appreciable height above the ground level through the vapor discharge stack 54, which is bifurcated at its lower end and has relatively diagonally downwardly diverging branches 55 extending laterally to locations over the normally open upper ends of the respective boxes 51 and terminating in vertically disposed sections 56, respectively, which extend downwardly through said open ends into the respective boxes, preferably to a level wherein substantial portions of these terminal ends 56 are located in vertically opposed relation to the ports 52. Nevertheless, the lower ends of the sections 56 are spaced above the bottoms 51a of their respective boxes 51. With this arrangement, the vapors escaping through each port 52 from the accumulator 26 will impinge against the depending end 56 of the stack portions or furcations, and a portion of the heat within the outflowing vapors will be transferred to the stack, thus to create an updraft therein. The hot vapors received within the boxes 51 will normally be somewhat heavier than the air. The incoming air moving downwardly through the open upper end of each box will carry the vapors down below the respective stack ends 56, and the intermixed vapors and air will then be free to pass upwardly through the stack sections 56, 55, and 54 into the upper air.

In the illustrated arrangement, the space or gap between the downwardly directed intake end of each stack section 56 and its relatively adjacent vapor port 52 constitutes a vent opening between these elements in communication with the atmosphere, which acts to prevent the transmission of any appreciable suction from the vapor stack to the infeed vapor accumulator 26.

In the event the nature of the treated material is such as to result in the evolution of an unusually great volume of excess gases to be discharged through the ports 52 and stack 54, it may be desirable to partially close or obstruct the upper ends of the respective boxes 51 to increase the proportion of the gases relative to the proportion of air which is drawn up to the stack. For this purpose, there may be employed, in conjunction with each closure 51, the cover 57 hinged to its upper end, as at 58, for swinging to and from closed position over the normally open upper end of its associated box 51.

It will be desirable to provide the main vertical portion 54 of the vapor stack with a damper 60, which is normally open at all times during the operation of the unit, but which may be closed in the event of ignition of the vapors within the stack in order to effectively control or extinguish them. In such event, the dampers 53 associated with the respective ports 52 may also be closed to prevent continued entry of the vapors to the stack, and thereby further contribute to the rapid extinction of ignited vapors within the stack.

The over-all operation of the invention, which is believed to be readily apparent from the foregoing, is briefly summarized as follows:

The furnace is started up and brought up to operating temperature, either by building and temporarily maintaining a wood fire in the combustion chamber 15, suitable access doors (not shown) being provided through the furnace walls for the purpose. As soon as vapors are generated in sufficient quantity to supply the burner nozzle 16, the wood fire is permitted to burn out.

The comminuted or pulverant organic material to be carbonized is fed into the unit at a constant rate from any suitable source of supply by means of the conveyor screw 40 operating within its associated tube 39, the lower end of which is disposed at a level below the infeed hopper 61, to avoid the creation of an updraft through the accumulator 26, the metering device 62 of the infeed hopper 61 while its upper end communicates with the infeed hopper at a location above the feed troughs 63 and 63′ associated with the respective tubes. The infeeding material thus is delivered into the respective feed trough 63 and 63′. As the material is initially fed into each retort tube 23, 23′, it is subjected to a heating and drying action, which results in the evolution of the more volatile vapor constituents, including a relatively large proportion of water vapor. This initially evolved vapor, being adjacent the infeed end of the unit, normally flows toward and into the infeed accumulator 26. During subsequent progress of the material through the respective carbonizing tubes 23, 23′, it is increasingly heated by the flame from burner nozzle 16 and evolves a considerable volume of further less volatile gases or vapors, of which at least a part are drawn into the discharge accumulator 25 at the rate required for supplying the burner nozzle 16. The remainder of such vapors not required by the burner nozzle, work their way back through their respective tubes 23, 23′ in a counterflow direction with respect to the feed movement of the solid material through these tubes. These vapors, which are at high heat and also are lacking in water vapor content, assist in heating the incoming solid material, as well as in drying same. The water vapor taken up by them incident to this drying function is carried with these vapors into the infeed accumulator 26, and all of the vapors are free to pass from the accumulator 26 and its associated discharge ports 52 into the boxes or enclosures 51 for subsequent removal and dispersal into the upper air by the vapor stack 54 in the manner above described and without imparting any substantially reduced pressure or suction to the infeed accumulator 26. Thus, this action does not effect any substantial or appreciable variation in the supply of vapors to the burner nozzle 16 as required to meet the requirements thereof.

In this application, there is disclosed only the preferred embodiment of the invention, simply by way of illustration of the preferred mode of carrying out the invention. It is recognized, however, that the invention may be modified in numerous respects, and that its several details may be altered in various ways, all without departing from the invention as defined in the accompanying claims.

What is claimed is:

1. A carbonizing unit for materials capable under the influence of heat of evolving combustible vapors, comprising a furnace, a substantially imperforate retort tube extending substantially horizontally through said furnace to be heated thereby, and having infeed and discharge openings adjacent its ends for reception and discharge of said materials, conveying means extending through said tube for feeding the materials therethrough from said infeed opening to said discharge opening, an enclosed discharge accumulator communicating with the discharge end of said tube for reception of part of said evolved vapors, a vapor burner in said furnace, conduit means extending between said discharge accumulator and said burner for delivering vapors from said discharge accumulator to said burner, an enclosed infeed accumulator communicating with said infeed end of the tube for reception of vapors from said tube in excess of the amounts required by said burner, said infeed accumulator being formed with a discharge port and means for permitting the escape of vapors through said port.

2. A carbonizing unit for materials capable under the influence of heat of evolving combustible vapors, comprising a furnace, a substantially imperforate retort tube extending substantially horizontally through said furnace to be heated thereby, and having infeed and discharge openings adjacent its ends for reception and discharge of said materials, conveying means extending through said tube for feeding the materials therethrough from said infeed opening to said discharge opening, an enclosed discharge accumulator communicating with the discharge end of said tube for reception of part of said evolved vapors, a vapor burner in said furnace, conduit means extending between said discharge accumulator and said burner for delivering vapors from said discharge accumulator to said burner, an enclosed infeed accumulator communicating with said infeed end of the tube for reception of vapors from said tube in excess of the amounts required by said burner, said infeed accumulator being formed with a discharge port and means for permitting the escape of vapors through said port, said conveyer means cooperating with said tube to define and maintain a substantially clear vapor passage between said accumulators.

3. A carbonizing unit for materials capable under the influence of heat of evolving combustible vapors, comprising a furnace, a substantially imperforate retort tube extending substantially horizontally through said furnace to be heated thereby, and having infeed and discharge openings adjacent its ends for reception and discharge of said materials, conveying means extending through said tube for feeding the materials therethrough from said infeed opening to said discharge opening, a vapor burner in said furnace, conduit means extending between said discharge opening and said burner for delivering vapors to said burner, an enclosed infeed accumulator communicating with said infeed end of the tube for reception of vapors from said tube in excess of the amounts required by said burner, said infeed accumulator being formed with a discharge port and means for permitting the escape of vapors through said port at substantially atmospheric pressure, said conveyer means cooperating with said tube to define and maintain a substantially clear vapor passage between said accumulators.

4. A carbonizing unit for materials capable under the influence of heat of evolving combustible vapors, comprising a furnace, a plurality of substantially imperforate retort tubes extending substantially horizontally through said furnace to be heated thereby, said tubes respectively having infeed and discharge openings adjacent their ends for reception and discharge of said materials, conveying means extending through the respective tubes for feeding the materials therethrough from said infeed openings to said discharge openings, a vapor burner in said furnace, conduit means extending between said discharge openings and said burner for supplying vapors to said burner, an enclosed infeed accumulator communicating with said infeed openings of the tubes for reception of vapors from the tubes in excess of the amounts required by said burner, an enclosed feed conveyer communicating in vapor-tight relation with the interior of said infeed accumulator for delivering said material to the respective tubes, and means communicating with said infeed accumulator for permitting the escape therefrom of vapors at a controlled pressure at least substantially equal to atmospheric pressure.

5. A carbonizing unit for materials capable under the influence of heat of evolving combustible vapors, comprising a furnace, a plurality of substantially imperforate retort tubes extending substantially horizontally through said furnace to be heated thereby, said tubes respectively having infeed and discharge openings adjacent their ends for reception and discharge of said materials, conveying means extending through the respective tubes for feeding the materials therethrough from said infeed openings to said discharge openings, a vapor burner in said furnace, conduit means extending between said discharge openings and said burner for supplying vapors to said burner, an enclosed infeed accumulator communicating with said infeed openings of the tubes for reception of vapors from the tubes in excess of the amounts required by said burner, a metering device communicating with said infeed accumulator, an infeed hopper for receipt and delivery of the material to said conveying means, an enclosed feed conveyer communicating in vapor-tight relation with the interior of said infeed accumulator for delivering said material to the respective tubes, and means communicating with said infeed accumulator for permitting the escape therefrom of vapors at a controlled pressure at least substantially equal to atmospheric pressure.

6. A carbonizing unit as defined in claim 5, wherein the intake end of said feed conveyer extends to a level below the bottom of said infeed hopper, whereby to avoid the creation of an updraft through said infeed hopper.

7. A carbonizing unit for materials capable under the influence of heat of evolving combustible vapors, comprising a furnace, a plurality of substantially imperforate retort tubes extending substantially horizontally through said furnace to be heated thereby, said tubes respectively having infeed and discharge openings adjacent their ends for reception and discharge of said materials, conveying means extending through the respective tubes for feeding the materials therethrough from said infeed openings to said discharge openings, a vapor burner in said furnace, conduit means extending between said discharge openings and said burner for supplying vapors to said burner, an enclosed infeed accumulator communicating with said infeed openings of the tubes for reception of vapors from the tubes in excess of the amounts required by said burner, an enclosed feed conveyer communicating in vapor-tight relation with the interior of said infeed accumulator for delivering said material to the respective tubes, means communicating with said infeed accumulator for permitting the escape therefrom of vapors at a controlled pressure at least substantially equal to atmospheric pressure, a heat stack operatively connected with said furnace for carrying off the products of combustion, a vapor stack independent of said heat stack, said infeed accumulator having a vapor escape port formed therein, an enclosure in communication with both said port and the intake end of said vapor stack, said port and said intake end being so spaced that vapors passing through said port impinge on said intake end, and means admitting air at atmospheric pressure into said enclosure to prevent the transmission of the suction of said vapor stack through said port.

8. A carbonizing unit for materials capable under the influence of heat of evolving combustible vapors, comprising a furnace, a plurality of substantially imperforate retort tubes extending substantially horizontally through said furnace to be heated thereby, said tubes respectively having infeed and discharge openings adjacent their ends for reception and discharge of said materials, conveying means extending through the respective tubes for feeding the materials therethrough from said infeed openings to said discharge openings, a vapor burner in said furnace, conduit means extending between said discharge openings and said burner for supplying vapors to said burner, an enclosed infeed accumulator communicating with said infeed openings of the tubes for reception of vapors from the tubes in excess of the amounts required by said burner, a metering device communicating with said infeed accumulator, an infeed hopper for receipt and delivery of the material to said conveying means, an enclosed feed conveyer communicating in vapor-tight relation with the interior of said infeed hopper for delivering said material to the respective tubes, means communicating with said infeed accumulator for permitting the escape therefrom of vapors at a controlled pressure at least substantially equal to atmospheric pressure, a heat stack operatively connected with said furnace for carrying off the products of combustion, a vapor stack independent of said heat stack, said infeed accumulator having a vapor escape port formed therein, an enclosure in communication with both said port and the intake end of said vapor stack, said port and said intake end being so spaced that vapors passing through said port impinge on said intake end, and means admitting air at atmospheric pressure into said enclosure to prevent the transmission of the suction of said vapor stack through said port.

9. A carbonizing unit for materials capable under the influence of heat of evolving combustible vapors, comprising a furnace, a plurality of substantially imperforate retort tubes extending substantially horizontally through said furnace to be heated thereby, said tubes respectively having infeed and discharge openings adjacent their ends for reception and discharge of said materials, conveying means extending through the respective tubes for feeding the materials therethrough from said infeed openings to said discharge openings, a vapor burner in said furnace, conduit means extending between discharge openings and said burner for supplying vapors to said burner, an enclosed infeed accumulator communicating with said infeed openings of the tubes for reception of vapors from the tubes in excess of the amounts required by said burner, an enclosed feed conveyer communicating in vapor-tight relation with the interior of said infeed accumulator for delivering said material to the respective tubes, means communicating with said infeed accumulator for permitting the escape therefrom of vapors at a controlled pressure at least substantially equal to atmospheric pressure, a discharge bin extending transversely to said tubes beneath the discharge openings of the respective tubes for reception of the material carbonized in said tubes, and a discharge conveyer auger operative in said bin for continuously removing the contents thereof.

10. A carbonizing unit for materials capable under the influence of heat of evolving combustible vapors, comprising a furnace, a plurality of substantially imperforate retort tubes extending substantially horizontally through said furnace to be heated thereby, said tubes respectively having infeed and discharge openings adjacent their ends for reception and discharge of said materials, conveying means extending through the respective tubes for feeding the materials therethrough from said infeed openings to said discharge openings, said conveyor means being of a smaller diameter than the inside of said retort tubes, a vapor burner in said furnace, conduit means extending between said discharge openings and said burner for supplying vapors to said burner, an enclosed infeed accumulator communicating with said infeed openings of the tubes for reception of vapors from the tubes in excess of the amounts required by said burner, a metering device communicating with said infeed accumulator, an infeed hopper for receipt and delivery of the material to said conveying means, an enclosed feed conveyer communicating in vapor-tight relation with the interior of said infeed hopper for delivering said material to the respective tubes through said metering device, means communicating with said infeed accumulator for permitting the escape therefrom of vapors at a controlled pressure at least substantially equal to atmospheric pressure, a discharge bin extending transversely to said tubes beneath the discharge openings of the respective tubes for reception of the material carbonized in said tubes, and a discharge conveyer auger operative in said bin for continuously removing the contents thereof.

11. A carbonizer unit for organic materials comprising a plurality of generally horizontal and substantially imperforate retort tubes having normally open infeed and discharge ends respectively, a conveyer operatively disposed through each said tube for feeding organic materials therethrough, first and second vapor-tight enclosures communicating with said infeed and discharge ends respectively of all of said tubes, a vapor burner beneath said tubes, a conduit for delivering vapors from said second enclosure to said burner for combustion in said burner, each said conveyer cooperating with its said tube to provide a free passageway for vapors between said enclosures, whereby all vapors not required for operation of said burner may find their way through said tubes to said first enclosure and, in so doing, the relatively dry and hot gases evolved in the medial and discharge end portions of the tubes will expedite the drying and heating of infeeding materials adjacent the infeed ends of the tubes, and means for discharging the vapors from said first enclosure at a controlled pressure at least substantially equal to atmospheric pressure.

12. A carbonizing unit as defined in claim 11 including a furnace housing said burner, and having relatively opposed walls supporting the infeed and discharge ends respectively of the said tubes, said discharge ends being fixedly supported through their respective wall, said infeed ends being slidably disposed through their respective wall for thermal expansion and contraction, and said first enclosure being fixed to said infeed ends for movement therewith.

13. A carbonizing unit for organic materials comprising a substantially imperforate retort tube having an infeed end and a discharge end, conveyer means within said tube for moving materials therethrough from said intake end to said discharge end, means supporting said tube in generally horizontal position, a gas fired furnace in heat exchanging relation with said tube, means defining a vapor conduit between the discharge end of said tube and said furnace for delivering evolved vapors from said tube into the furnace, a heat stack operatively associated with said furnace for creating a draft therethrough tending to draw said vapors into the furnace, and means in substantially vapor-tight communication with the infeed end of said tube for receiving from the tube all vapors in excess of those required by the furnace, said means including a vapor stack independent of said heat stack and with its intake end communicating with said infeed end of the tube, and means for freely admitting air from outside of the furnace at atmospheric pressure into the intake end of said vapor stack to prevent said stack from producing a subatmospheric pressure within said tube.

14. A carbonizing unit as defined in claim 13, wherein said conveyer comprises an auger rotatably supported on the bottom of said horizontal tube and spaced from the top thereof to provide a substantially unobstructed passageway for vapors between the ends of the tube, and feed conveyer delivering material to said auger at a rate substantially less than the feed capacity of the auger, whereby to maintain the level of material within the tube below said passageway.

15. A carbonizing unit as defined in claim 13, wherein said conveyer comprises an auger rotatably supported on the bottom of said horizontal tube and spaced from the top thereof to provide a substantially unobstructed passageway for vapors between the ends of the tube, an infeed hopper for receipt and delivery of the material to said conveyer means, a feed conveyer delivering material to said infeed hopper at a rate to permit proper feeding of the material to the carbonizing tube, a metering device for feeding the material to the tube at a rate that will insure complete carbonization during its passage from the infeed end to the discharge end of the carbonizing tube and at the same time to maintain within the tube an unobstructed passageway for vapors between the ends of the tube.

16. A carbonizing unit comprising a furnace having a burner chamber therein, a plurality of substantially imperforate tubular retorts extending horizontally through said furnace and heated thereby, said tubular retorts opening through opposite ends of the furnace, a vertical heat stack communicating with said burner chamber through the interior of said furnace for drawing off the products of combustion, conveying means within said tubular retorts for moving material through said tubular retorts at a predetermined rate of speed to be carbonized, a feed hopper, a metering device and a vapor accumulating chamber at one end of the furnace defining an enclosed chamber at and communicating with the infeed ends of the respective retorts, an enclosed conveyer in substantially vapor-tight communication with said feed hopper for delivering material thereinto, from a location below said hopper, an enclosed discharge bin at the other end of the furnace and exteriorly thereof for receiving the carbonized material, together with gases evolved therefrom, a discharge conduit communicating with said bin, a discharge conveyer for removing the contents of said bin through said conduit, means for injecting steam into said conduit for cooling and partially activating the treated material, a gas burning nozzle extending through the said other end of the furnace into the burner chamber, a gas supply conduit extending vertically downwardly from the accumulator and establishing communication between said burner nozzle and the upper portion of the accumulator, whereby gases evolved from the treated material and delivered in said accumulator may be drawn through said burner by the draft of said combustion stack; the lower end of said gas supply conduit being open, a water reservoir receiving said open end beneath the level of the water therein to provide a combined water seal and safety valve; in conbination with an upwardly opening receptacle exteriorly of and communicating with said vapor accumulating chamber through a passage which opens from said chamber into said receptacle below the upward opening thereof, whereby some of the vapors evolved from treated material may flow from said vapor accumulating chamber into said receptacle, a vapor stack extending downwardly through the upward opening of said receptacle below the opening of said passage into said receptacle, whereby said vapors will be directed against and warm the lower end of said stack to induce an upward draft therethrough, said stack being received through said open upper end by means of a hinged cover to provide for venting the stack to the atmosphere.

17. A carbonizing unit as defined in claim 3 wherein the evolved vapor conduit means includes at the materials infeed end of the carbonizing tubes an enclosure vented to the atmosphere, a bifurcated vapor discharge stack extending downwardly into said enclosure, said vapor stack being so located that evolved vapors will impinge upon its lower extremities and heat it sufficiently to cause an updraft resulting in the discharge of the mixture of evolved vapors and air into the atmosphere at the upper end of the vapor stack.

18. Apparatus for dry distillation comprising a furnace, a substantially imperforate retort tube disposed generally horizontally within said furnace in a manner to be heated by the combustion of fuel therein, conveyor means located within said retort tube in a manner to provide a passage along the upper portion of said tube, an accumulator for receiving gases evolved from the treatment of matter in said retort tube and supplying a portion of said gases as fuel for combustion within said furnace, a second accumulator for the collection and disposition of gases in excess of that consumed in said furnace, and a vapor stack in communication with said second accumulator for the control of movement and disposition of excess evolved gases.

References Cited in the file of this patent

UNITED STATES PATENTS

| | | |
|---|---|---|
| 551,113 | Ekelund | Dec. 10, 1895 |
| 1,101,174 | Gauntt | June 23, 1914 |
| 1,540,662 | Stone | June 2, 1925 |
| 1,653,387 | Brown | Dec. 20, 1927 |
| 1,827,199 | Holthoff | Oct. 13, 1931 |
| 1,944,192 | Riddell | Jan. 23, 1934 |
| 1,987,372 | Schellhammer | Jan. 8, 1935 |
| 2,108,087 | Thayer | Feb. 15, 1938 |
| 2,216,704 | Flanagan | Oct. 1, 1940 |
| 2,265,857 | Reynoldson | Dec. 9, 1941 |
| 2,398,446 | Phillipson | Apr. 16, 1946 |
| 2,411,097 | Kopp | Nov. 12, 1946 |
| 1,930,211 | Nelson | Oct. 10, 1933 |
| 2,723,021 | Nicolai et al. | Nov. 8, 1955 |
| 2,768,943 | De Vries | Oct. 30, 1956 |
| 2,973,306 | Chick et al. | Feb. 28, 1961 |